(12) United States Patent
Kim et al.

(10) Patent No.: US 11,140,306 B2
(45) Date of Patent: Oct. 5, 2021

(54) METHOD FOR CONTROLLING MONITORING CAMERA, AND MONITORING SYSTEM EMPLOYING METHOD

(71) Applicant: Hanwha Techwin Co., Ltd., Seongnam-si (KR)

(72) Inventors: Yeon Woo Kim, Seongnam-si (KR); Ho Jung Lee, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 137 days.

(21) Appl. No.: 16/314,715

(22) PCT Filed: Oct. 27, 2016

(86) PCT No.: PCT/KR2016/012110
§ 371 (c)(1),
(2) Date: Jan. 2, 2019

(87) PCT Pub. No.: WO2018/070584
PCT Pub. Date: Apr. 19, 2018

(65) Prior Publication Data
US 2019/0320108 A1    Oct. 17, 2019

(30) Foreign Application Priority Data
Oct. 13, 2016 (KR) .................... 10-2016-0132852

(51) Int. Cl.
*H04N 5/232* (2006.01)
*H04N 7/18* (2006.01)

(52) U.S. Cl.
CPC ..... *H04N 5/23203* (2013.01); *H04N 5/23299* (2018.08); *H04N 5/232939* (2018.08); *H04N 7/183* (2013.01)

(58) Field of Classification Search
CPC ............... H04N 5/23203; H04N 7/185; H04N 5/23216; H04N 5/232939; H04N 5/232941; H04N 5/232945
See application file for complete search history.

(56) References Cited

U.S. PATENT DOCUMENTS 5,929,904 A * 7/1999 Uchida .............. H04N 5/23299
348/211.7
6,611,285 B1   8/2003 Morita
(Continued)

FOREIGN PATENT DOCUMENTS

CN   101917598 A   12/2010
JP   10-093855 A   4/1998
(Continued)

OTHER PUBLICATIONS

Search Report dated Jul. 13, 2017, issued by the International Searching Authority in counterpart International Patent Application No. PCT/KR2016/012110 (PCT/ISA/210).
(Continued)

*Primary Examiner* — Brian T Pendleton
*Assistant Examiner* — Frank Johnson
(74) *Attorney, Agent, or Firm* — Sughrue Mion, PLLC

(57) ABSTRACT

Provided is a method of controlling a monitoring camera. In the method, a live-view video is displayed on a first region of a display panel, and a plurality of angle-range icons corresponding to panning angle-ranges or tilting angle-ranges is displayed on a second region of the display panel. When one of the plurality of angle-range icons is selected, a control signal for executing panning or tilting at a representative angle of a panning angle-range or tilting angle-range of the selected angle-range icon is transmitted to the monitoring camera.

18 Claims, 10 Drawing Sheets

(56) References Cited

U.S. PATENT DOCUMENTS

| | | | |
|---|---|---|---|
| 8,489,065 B2 | 7/2013 | Green et al. | |
| 9,361,011 B1* | 6/2016 | Burns | G06F 3/14 |
| 2002/0135677 A1* | 9/2002 | Noro | H04N 7/181 |
| | | | 348/143 |
| 2004/0207728 A1* | 10/2004 | Kihara | H04N 7/147 |
| | | | 348/143 |
| 2007/0064097 A1* | 3/2007 | Cupal | H04M 3/42391 |
| | | | 348/14.16 |
| 2007/0206100 A1* | 9/2007 | Hikita | H04N 5/23216 |
| | | | 348/211.7 |
| 2008/0101789 A1* | 5/2008 | Sharma | G03B 17/00 |
| | | | 396/427 |
| 2008/0130951 A1* | 6/2008 | Wren | H04N 7/18 |
| | | | 382/103 |
| 2009/0262206 A1* | 10/2009 | Park | G08B 13/19641 |
| | | | 348/218.1 |
| 2011/0058036 A1* | 3/2011 | Metzger | H04N 7/181 |
| | | | 348/143 |
| 2011/0115728 A1* | 5/2011 | Kwak | G06F 3/0482 |
| | | | 345/173 |
| 2013/0021433 A1* | 1/2013 | Belsarkar | H04N 7/181 |
| | | | 348/36 |
| 2013/0076908 A1* | 3/2013 | Bratton | H04N 5/232 |
| | | | 348/159 |
| 2013/0091432 A1* | 4/2013 | Shet | G08B 13/19645 |
| | | | 715/719 |
| 2013/0155178 A1* | 6/2013 | Mock | H04N 5/23216 |
| | | | 348/14.08 |
| 2014/0074932 A1* | 3/2014 | Mihara | H04L 67/06 |
| | | | 709/204 |
| 2015/0103179 A1* | 4/2015 | Galvin | H04N 21/2187 |
| | | | 348/159 |
| 2015/0222860 A1 | 8/2015 | Gottschlag et al. | |
| 2015/0296131 A1* | 10/2015 | Onsen | H04N 5/23206 |
| | | | 348/207.11 |
| 2016/0127690 A1* | 5/2016 | Kaehler | G06T 19/003 |
| | | | 348/143 |
| 2016/0142680 A1* | 5/2016 | Tsunematsu | G06K 9/00342 |
| | | | 348/159 |
| 2016/0150193 A1* | 5/2016 | Niida | H04N 5/23296 |
| | | | 348/143 |
| 2017/0339336 A1* | 11/2017 | Daliyot | G06F 3/0482 |

FOREIGN PATENT DOCUMENTS

| | | |
|---|---|---|
| JP | 10-136246 A | 5/1998 |
| JP | 2001-69495 A | 3/2001 |
| JP | 3468255 B2 | 11/2003 |
| JP | 3968507 B2 | 8/2007 |
| JP | 2011-129068 A | 6/2011 |
| KR | 10-2010-0023270 A | 3/2010 |
| KR | 10-2010-0096037 A | 9/2010 |
| KR | 10-1070274 B1 | 10/2011 |
| KR | 10-2012-0050546 A | 5/2012 |
| KR | 10-2012-0125037 A | 11/2012 |
| KR | 10-1297294 B1 | 8/2013 |

OTHER PUBLICATIONS

Written Opinion dated Jul. 13, 2017, issued by the International Searching Authority in counterpart International Patent Application No. PCT/KR2016/012110 (PCT/ISA/237).

Communication dated Aug. 13, 2020 issued by the State Intellectual Property Office of P.R. China in counterpart Chinese Application No. 201680089150.1.

* cited by examiner

| CUMULATIVE NUMBER OF OCCURRENCES | R | G | B |
|---|---|---|---|
| NO MORE THAN 5 TIMES | 200 | 200 | 200 |
| 6 TO 10 TIMES | 200 | 150 | 150 |
| 11 TO 15 TIMES | 200 | 100 | 100 |
| 16 TO 20 TIMES | 200 | 50 | 50 |
| NO LESS THAN 21 TIMES | 200 | 0 | 0 |

METHOD FOR CONTROLLING MONITORING CAMERA, AND MONITORING SYSTEM EMPLOYING METHOD

TECHNICAL FIELD

The present disclosure relates to methods of controlling a monitoring camera and monitoring systems employing the methods, and more particularly, to a method by which a user input/output (I/O) device that receives information of an event and a live-view video from a monitoring camera controls the monitoring camera, and a monitoring system employing the method.

BACKGROUND ART

A user input/output (I/O) device that receives information of an event and a live-view video from a monitoring camera may control the monitoring camera. For example, when a smartphone as a user I/O device executes a viewer program of a monitoring camera, the smartphone may control panning or tilting of the monitoring camera according to a command of a user. In most cases, only panning is performed. However, in some cases, tilting may also be performed.

A conventional method employed to control panning or tilting of a monitoring camera as described above is as follows.

First, as a user drags the screen of a display panel, a monitoring camera performs panning or tilting.

Second, as the user presses an arrow button or a control button on the display panel, the monitoring camera performs panning or tilting.

According to such a conventional control method, a user can view a screen of a desired panning angle or a desired tilting angle through a large number of repeated manipulations. For example, after the user views the screen of the desired panning angle or the desired tilting angle through many repeated manipulations, the user should perform many repeated manipulations again in order to view the screen of the previously applied angle again.

To address this problem, a presetting function is disclosed. In a presetting mode, a user may previously set points of his or her desired panning angle or tilting angle. When this presetting function is applied, a monitoring camera may quickly perform panning or tilting at the points of the panning angle or tilting angle desired by the user. However, the presetting function has the following problems.

First, the user should perform a preset manipulation every time the user wants points of a new panning angle.

Second, when a panning motor or tilting motor of the monitoring camera has low precision (in most cases, the precision is low due to a cost issue), precision of panning or tilting due to presetting is reduced. In particular, in a presetting path where a plurality of points are set, as panning or tilting continues, operational errors are accumulated, and thus a difference between a location of an actual panning or tilting result and a set location gradually increases.

The problems disclosed in this Background section were already known to the inventors of the present invention before achieving the present invention or are technical problems acquired in the process of achieving the present invention. Therefore, it may contain problems that do not form the prior art that is already known in this country to a person of ordinary skill in the art.

DESCRIPTION OF EMBODIMENTS

Technical Problem

Provided is a method of controlling a monitoring camera, by which panning or tilting may be fast performed at points of a panning angle or tilting angle desired by a user and accordingly, a presetting function with low precision does not need to be used.

Provided is a monitoring system employing the method of controlling a monitoring camera.

Solution to Problem

According to an aspect of the present disclosure, a method, performed by a user input/output (I/O) device that receives information of an event and a live-view video from a monitoring camera, of controlling the monitoring camera includes three operations.

In a first operation, the user I/O device displays the live-view video received from the monitoring camera on a first region of a display panel.

In a second operation, the user I/O device displays a plurality of angle-range icons corresponding to panning angle-ranges or tilting angle-ranges on a second region of the display panel.

In a third operation, when one of the plurality of angle-range icons is selected, the user I/O device transmits, to the monitoring camera, a control signal for executing panning or tilting at a representative angle of a panning angle-range or tilting angle-range of the selected angle-range icon.

According to an aspect of the present disclosure, a monitoring system employing the controlling method includes a user I/O device comprising a display panel provided therein; and a monitoring camera configured to perform photography while performing panning or tilting according to control signals from the user I/O device and to provide information of an event and a live-view video to the user I/O device.

The live-view video received from the monitoring camera is displayed on a first region of the display panel.

A plurality of angle-range icons corresponding to panning angle-ranges or tilting angle-ranges are displayed on a second region of the display panel.

When one of the plurality of angle-range icons is selected, panning or tilting is performed at a representative angle of a panning angle-range or tilting angle-range of the selected angle-range icon.

Advantageous Effects of Disclosure

In a method of controlling a monitoring camera and a monitoring system according to an embodiment of the present disclosure, the monitoring camera may fast perform panning or tilting at points of a panning angle or tilting angle desired by a user, and convenient and effective monitoring may be performed.

BRIEF DESCRIPTION OF DRAWINGS

FIG. 13 illustrates a look-up table that is applied to color adjusting operation S1203 of FIG. 12.

BEST MODE

The following description and attached drawings are to understand operations according to the present disclosure, and matters that may be easily embodied by one of ordinary skill in the art to which the present disclosure pertains will not be described.

The present specification and drawings are not provided to limit the present disclosure, and the scope of the present disclosure should be defined by the following claims. Terms used herein should be interpreted as having a meaning and a concept that are consistent with the technical spirit of the present disclosure.

Hereinafter, embodiments of the present disclosure will be described more fully with reference to the accompanying drawings.

Figure 1:
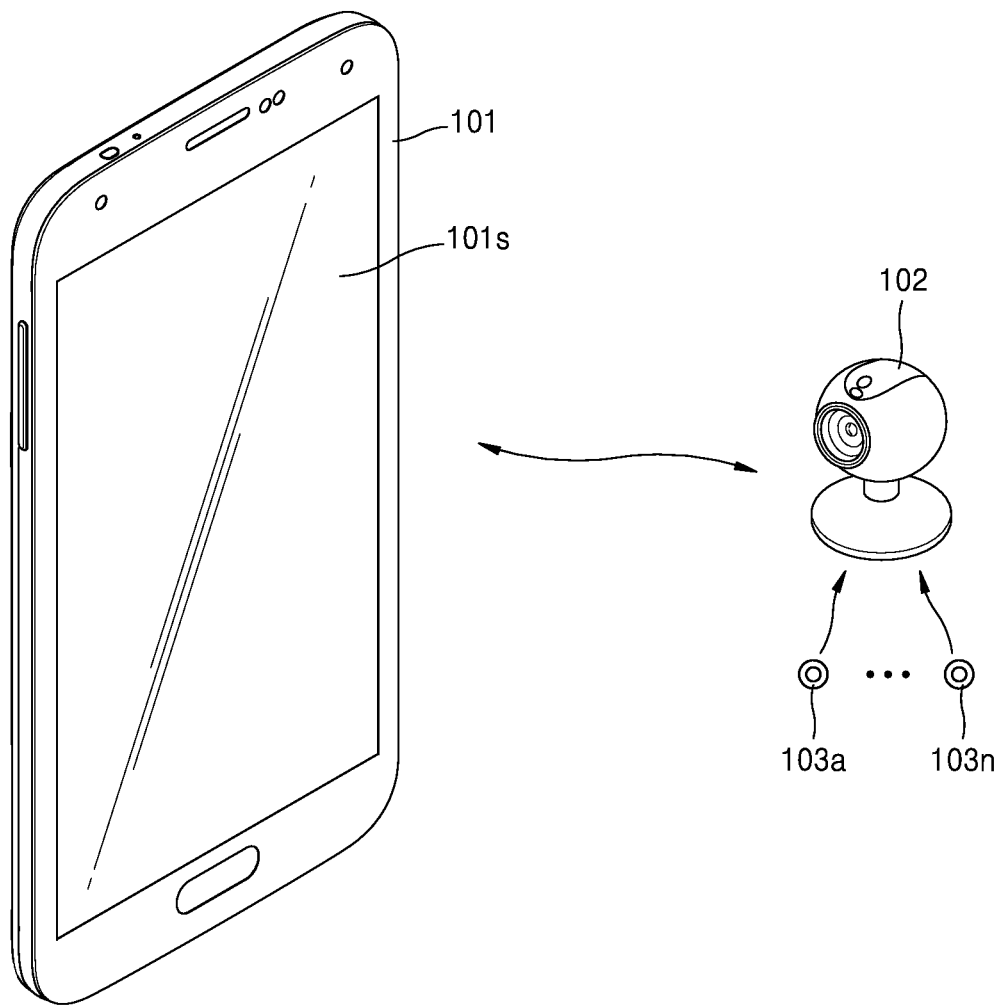
FIG. 1 is a schematic diagram of a monitoring system employing a control method, according to an embodiment of the present disclosure.

FIG. 1 is a schematic diagram of a monitoring system employing a controlling method according to an embodiment of the present disclosure.

Referring to FIG. 1, the monitoring system employing the controlling method according to the present embodiment includes a user input/output (I/O) device 101, a monitoring camera 102, and sensors 103a through 103n.

In a smartphone as the user I/O device 101, a display panel 101s is provided.

The monitoring camera 102 performs photography while performing panning or tilting according to control signals from the user I/O device 101, and provides information of an event and a live-view video to the user I/O device 101.

The sensors 103a through 103n are included to inform that an event has occurred.

When an event occurs, event occurrence signals from the sensors 103a through 103n are transmitted to the monitoring camera 102, and accordingly, the monitoring camera 102 transmits information of the event to the user I/O device 101.

In the user I/O device 101, panning angle-ranges or tilting angle-ranges corresponding to respective locations of the sensors 103a through 103n are set.

Figure 2:
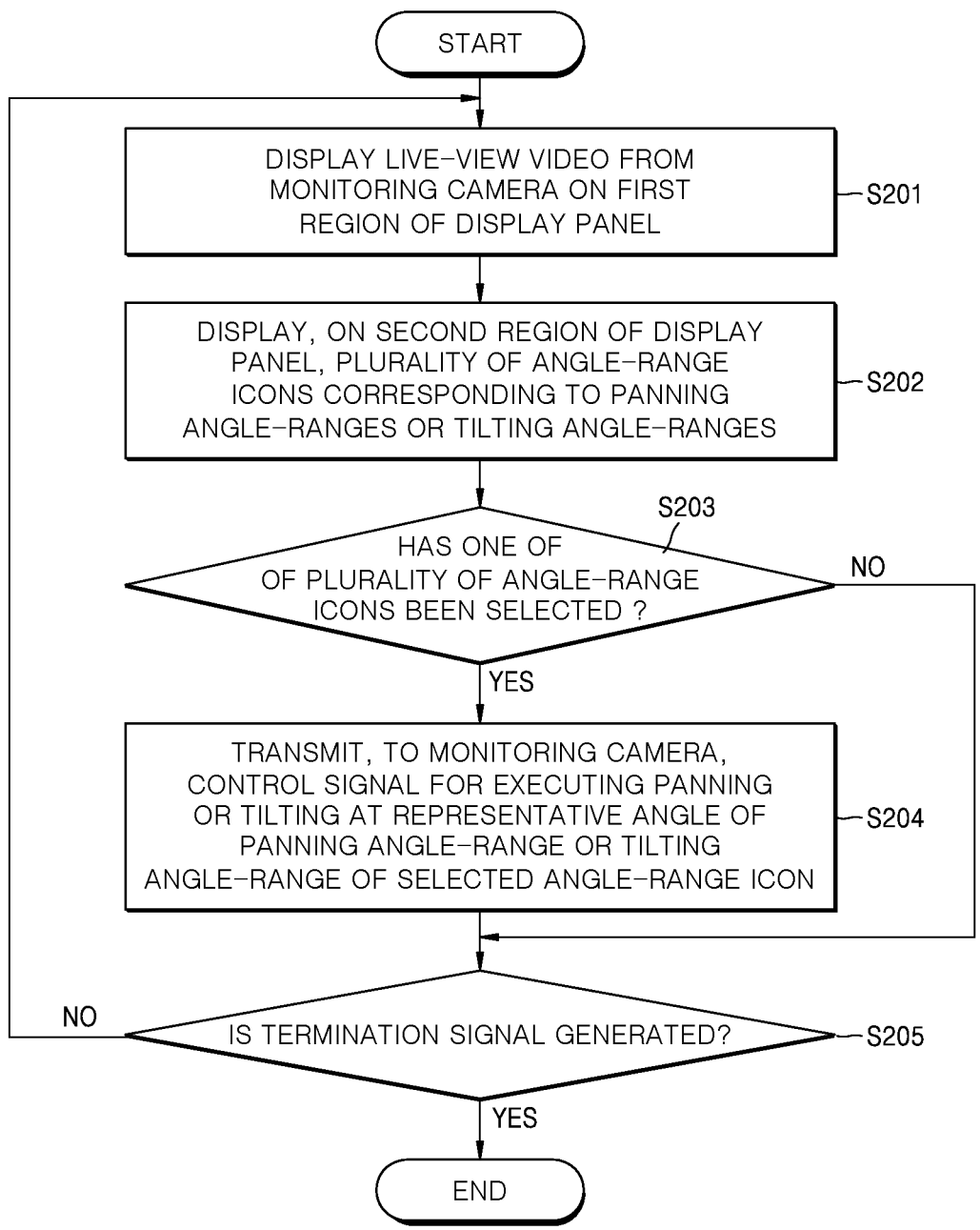
FIG. 2 is a flowchart of a method, performed by a smartphone as a user input/output (I/O) device included in the monitoring system of FIG. 1, of controlling a monitoring camera included in the monitoring system of FIG. 1.

FIG. 2 is a flowchart of a method, performed by a smartphone as the user I/O device 101 of FIG. 1, of controlling the monitoring camera 102.

Figure 3:
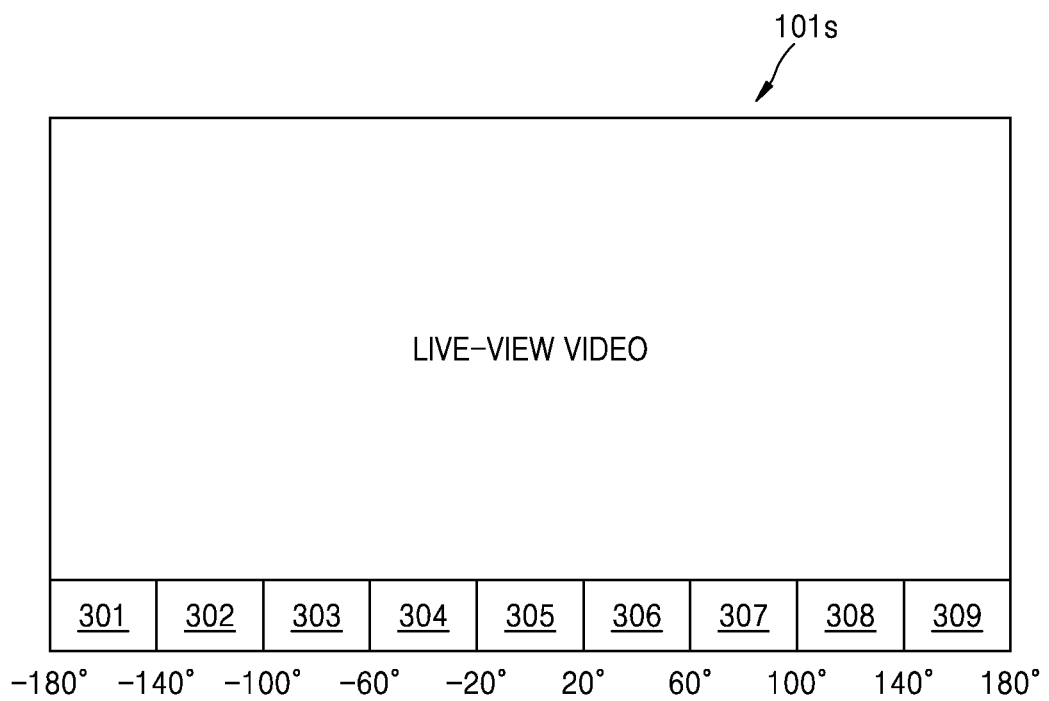
FIG. 3 illustrates a screen of a display panel of the smartphone of FIG. 1.

FIG. 3 illustrates an example of a screen of the display panel 101s of the smartphone 101 of FIG. 1.

The controlling method according to the present embodiment will be described with reference to FIGS. 1 through 3 as follows.

In operation S201, the user I/O device 101 displays a live-view video from the monitoring camera 102 on a first region of the display panel 101s.

Next, in operation S202, the user I/O device 101 displays, on a second region of the display panel 101s, a plurality of angle-range icons 301 through 309 corresponding to the panning angle-ranges (or the tilting angle-ranges).

According to the present embodiment, each of the 9 angle-range icons 301 through 309, namely, first through ninth angle-range icons 301 through 309, is assigned an angle range of 40°. For example, the first angle-range icon 301 is assigned an angle range of −180° to −140°.

Then, when one of the plurality of angle-range icons 301 through 309 is selected in operation S203, the user I/O device 101 transmits, to the monitoring camera 102, a control signal for executing panning or tilting at a representative angle of a panning angle-range or tilting angle-range of the selected angle-range icon, in operation S204.

According to the present embodiment, the representative angle is a center angle of the panning angle-range or tilting angle-range. For example, because the fifth angle-range icon 305 is assigned an angle range of −20° to 20°, when the fifth angle-range icon 305 is selected, a panning angle of the monitoring camera 102 is 0°.

According to the present embodiment, the display panel 101s is a touch-display panel.

The controlling method of FIG. 2 may be included in a viewer program of the monitoring camera 102 that is performed by a smartphone as the user I/O device 101. In other words, the controlling method of FIG. 2 may be converted into a computer program for executing the controlling method of FIG. 2, and the computer program may be stored in a computer-readable recording medium.

In the controlling method of FIG. 2, when one of the plurality of angle-range icons 301 through 309 is selected, panning or tilting is performed at a representative angle of a panning angle-range or tilting angle-range of the selected angle-range icon. Accordingly, the following effects are generated.

First, a user may intuitively select an icon (one of the angle-range icons 301 through 309) of his or her desired panning angle-range or tilting angle-range. Accordingly, the monitoring camera 102 may fast perform panning or tilting at points of a panning angle or tilting angle desired by the user.

For example, after panning or tilting is fast performed at a representative angle of the panning angle-range or tilting angle-range selected by the user, the user may view a screen of a desired point via a small number of manipulations (such as, dragging).

Second, because the monitoring camera 102 may fast perform panning or tilting at the points of the panning angle or tilting angle desired by the user, a presetting function with low precision does not need to be used. Accordingly, convenience of the user increases.

Figure 4:
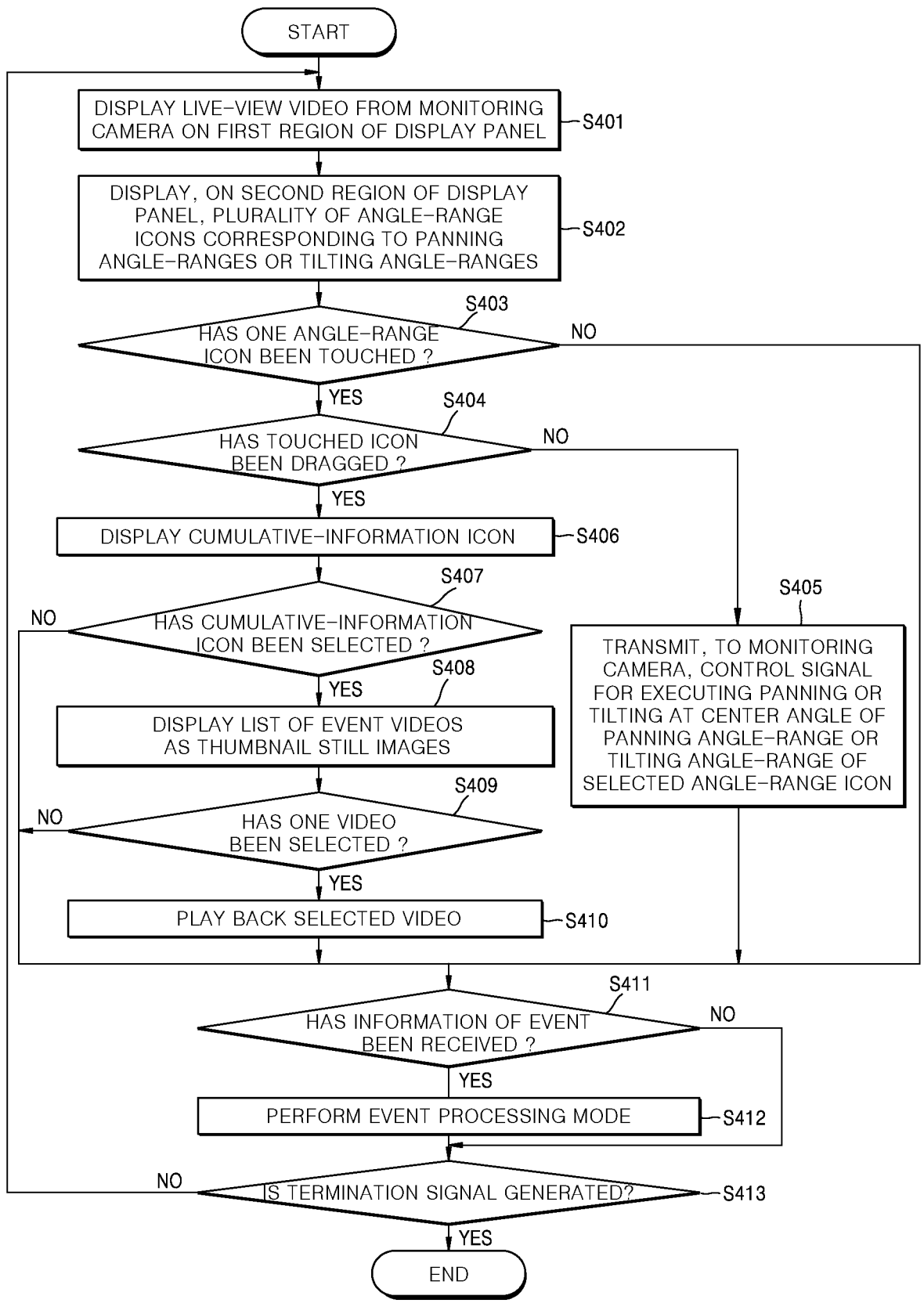
FIG. 4 is a flowchart of an overall operation of the smartphone of FIG. 1.
Figure 5:
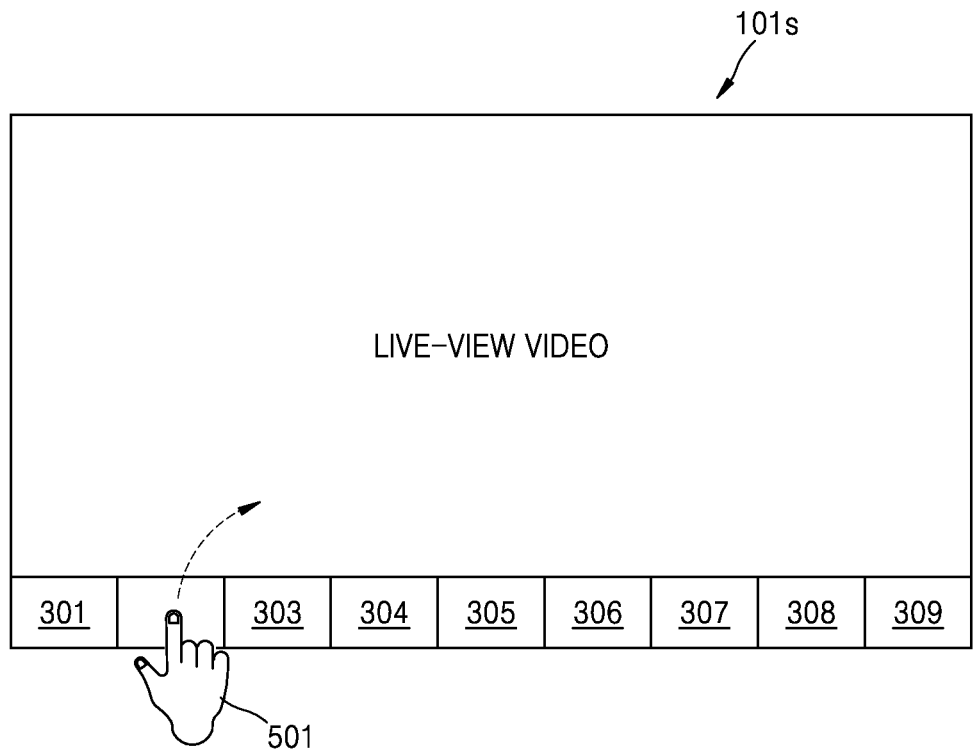
FIG. 5 illustrates one angle-range icon being touched.
Figure 6:
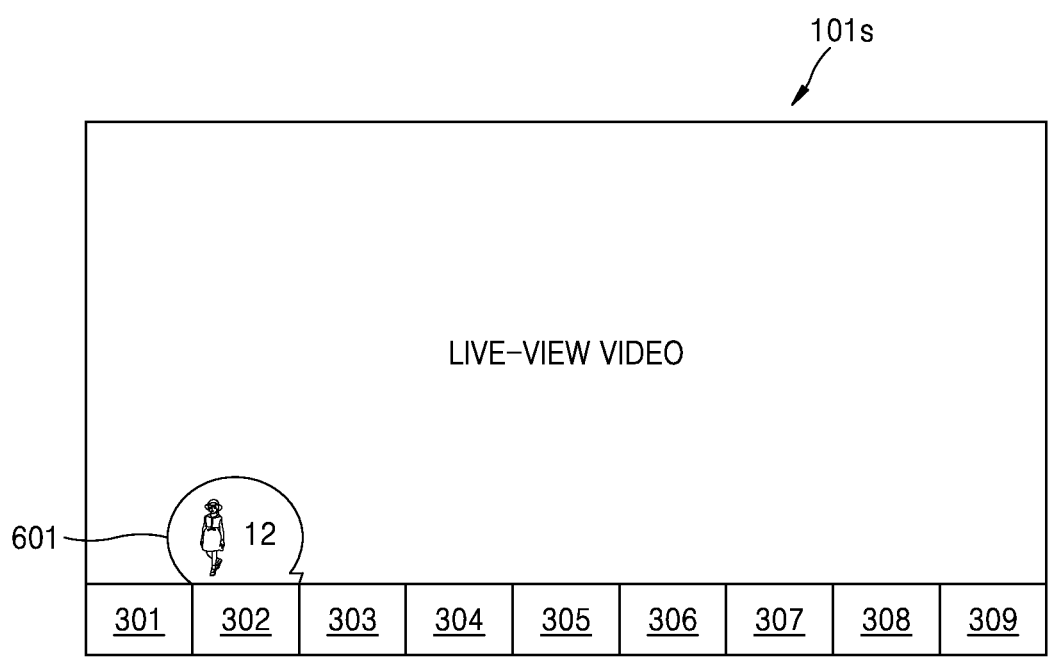
FIG. 6 illustrates a first example of operation S406 of FIG. 4 in which a cumulative-information icon is displayed around one angle-range icon.
Figure 7:
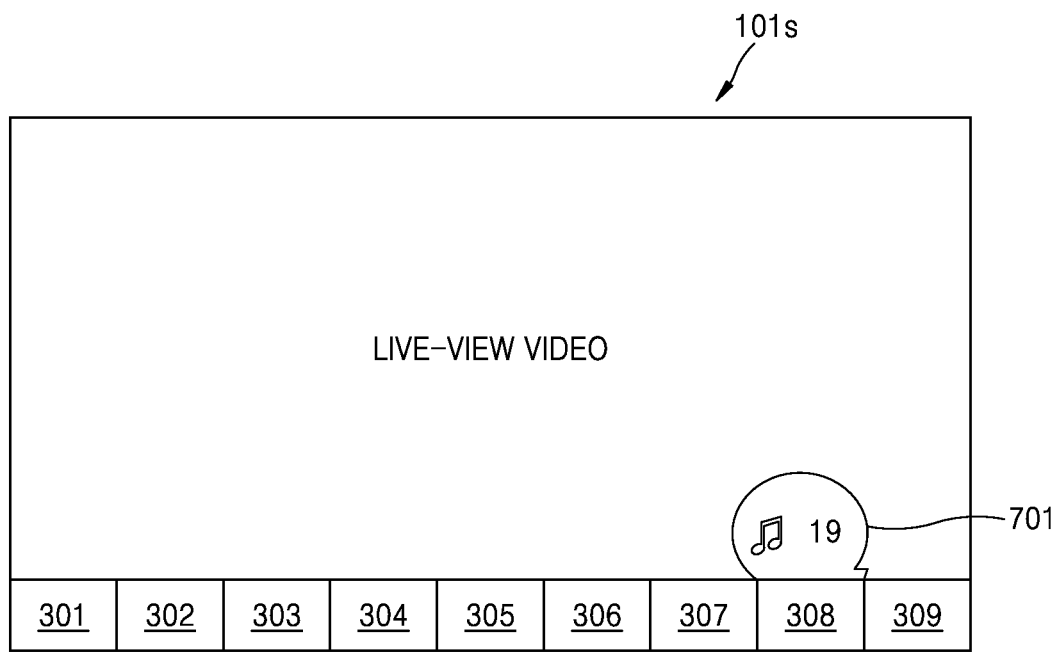
FIG. 7 illustrates a second example of operation S406 of FIG. 4 in which a cumulative-information icon is displayed around one angle-range icon.
Figure 8:
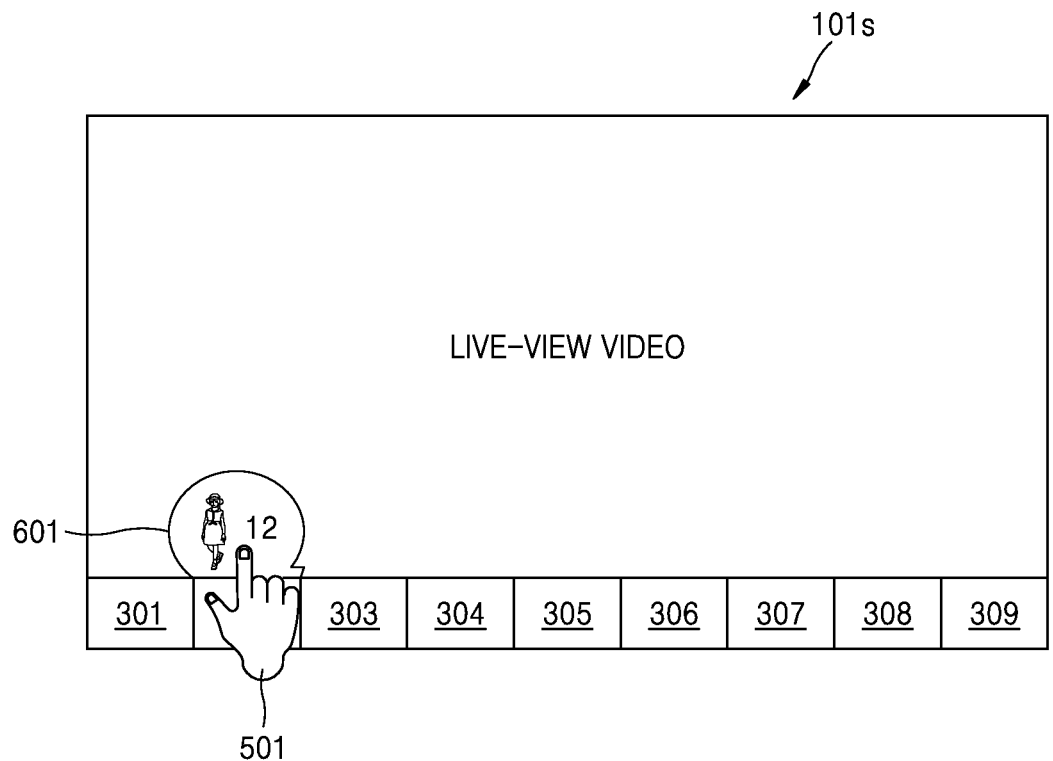
FIG. 8 illustrates the cumulative-information icon of FIG. 6 being touched.
Figure 9:
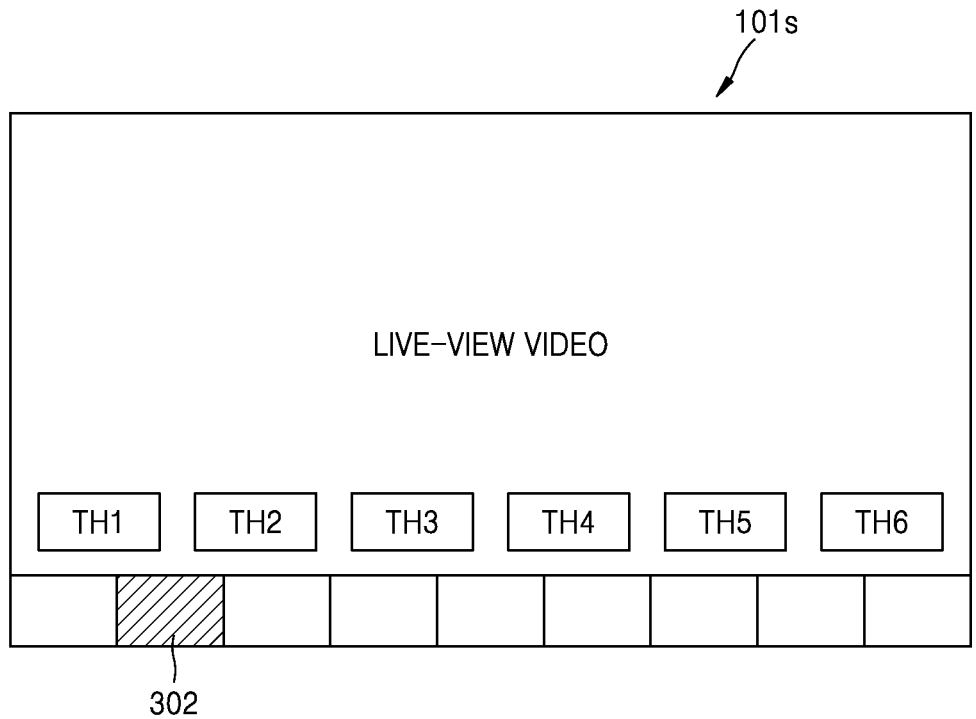
FIG. 9 illustrates that, when one cumulative-information icon is touched as shown in FIG. 8, a list of event videos is displayed.
Figure 10:
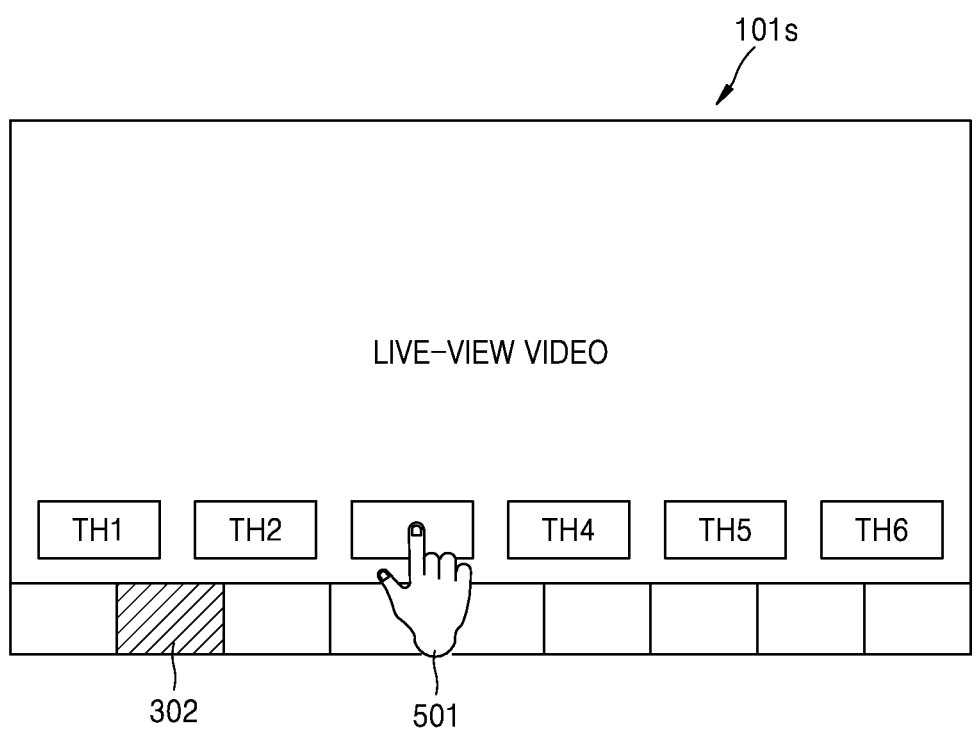
FIG. 10 illustrates one thumbnail still image of FIG. 9 being touched.
Figure 11:
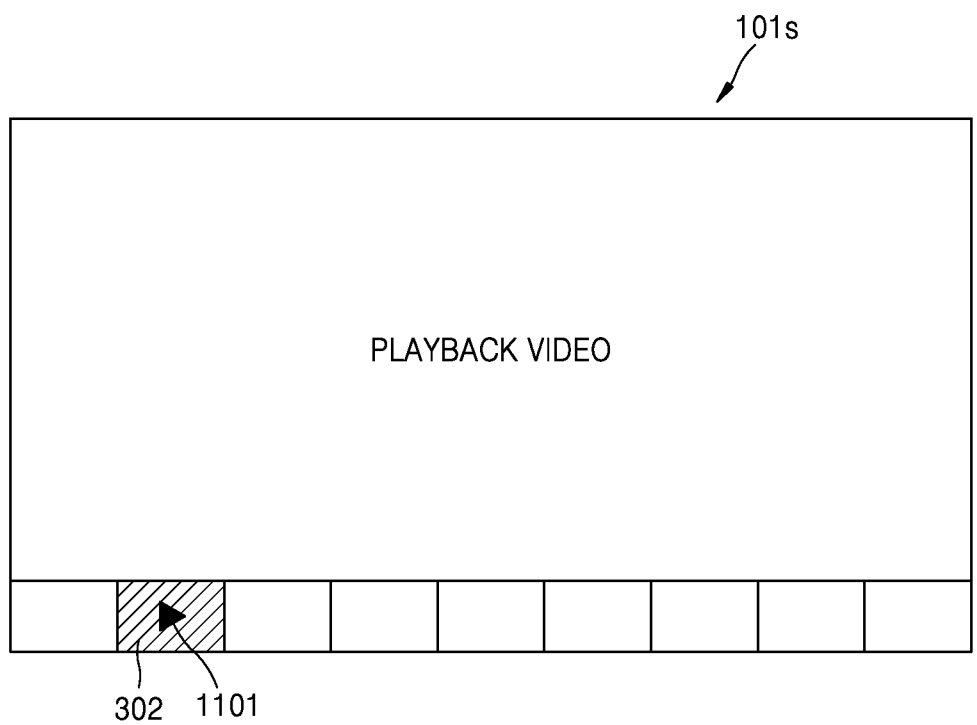
FIG. 11 illustrates that, when one thumbnail still image is touched as shown in FIG. 10, a selected video is played back.

FIG. 4 is a flowchart of an overall operation of a smartphone as the user I/O device 101 of FIG. 1. FIG. 5 illustrates that the single angle-range icon 302 is touched. FIG. 6 illustrates a first example of operation S406 of FIG. 4 in which a cumulative-information icon 601 is displayed around the angle-range icon 302. FIG. 7 illustrates a second example of operation S406 of FIG. 4 in which a cumulative-information icon 701 is displayed around the angle-range icon 308. FIG. 8 illustrates that the cumulative-information icon 601 of FIG. 6 is touched. FIG. 9 illustrates that, when the cumulative-information icon 601 is touched as shown in FIG. 8, a list of event videos TH1 through TH6 is displayed. FIG. 10 illustrates that a thumbnail still image TH3 of FIG. 9 is touched. FIG. 11 illustrates that, when the thumbnail still image TH3 is touched as shown in FIG. 10, a selected video is played back. In FIGS. 5 through 11, like reference numerals or characters indicate objects having the same function.

The overall operation of the user I/O device 101 will be described with reference to FIGS. 4 through 11 as follows.

In operation S401, the user I/O device 101 displays a live-view video from the monitoring camera 102 of FIG. 1 on the first region of the display panel 101s.

Next, in operation S402, the user I/O device 101 displays, on the second region of the display panel 101s, the plurality of angle-range icons 301 through 309 corresponding to the panning angle-ranges (or the tilting angle-ranges).

Next, in operation S403 (see FIG. 5), the user I/O device 101 determines whether one angle-range icon has been selected. According to the present embodiment, "selection" of an icon is made by "touching" the icon. However, "selection" of an icon may be made via other manipulations.

When one angle-range icon has not been selected, operation S411 and its subsequent operations are performed. On the other hand, when one angle-range icon has been selected, operation S404 and its subsequent operations are performed.

In operation S404, the user I/O device 101 determines whether the touched icon has been dragged. Referring to FIG. 5, a hand 501 of the user touches the second angle-range icon 302. The user may drag the second angle-range icon 302 in an arrow direction indicated by a dotted line.

According to the present embodiment, when the touched icon has not been dragged, the touched icon is considered to be selected using a first method. In this case, the user I/O device 101 transmits, to the monitoring camera 102, a control signal for executing panning or tilting at a center angle of a panning angle-range or tilting angle-range of the selected angle-range icon, in operation S405.

Accordingly, the monitoring camera 102 performs panning or tilting at the center angle of the panning angle-range or tilting angle-range of the selected angle-range icon. For example, when the second angle-range icon 302 is touched, the monitoring camera 102 performs panning at –120° (see FIGS. 3 and 5).

When it is determined in operation S404 that the touched angle-range icon has been dragged, the touched angle-range icon is considered to be selected according to a second method. In this case, operation S406 and its subsequent operations are performed.

In operation S406, the user I/O device 101 displays, around the selected angle-range icon 302, the cumulative-information icon 601 informing cumulative information of an event (see FIG. 6). FIG. 7 illustrates that, when the eighth angle-range icon 308 has been selected, the cumulative-information icon 701 is displayed.

On the cumulative-information icon 601 or 701, a character indicating the type of an event and the number of times the event has occurred are displayed. In the case of FIG. 6, the cumulative-information icon 601 informs that an event of human detection has occurred twelve times in a panning range (or tilting range) corresponding to the second angle-range icon 302. In the case of FIG. 7, the cumulative-information icon 701 informs that an event of a certain sound has occurred nineteen times. In this way, cumulative information of an event that has occurred in the panning angle-range or tilting angle-range of each angle-range icon is provided to the user, and accordingly convenient and effective monitoring may be performed.

Next, in operation S407, the user I/O device 101 determines whether the cumulative-information icon 601 or 701 has been selected. Referring to FIG. 8, the cumulative-information icon 601 is selected by being touched by the hand 501 of the user. When the cumulative-information icon 601 or 701 has not been selected, operation S411 and its subsequent operations are performed. On the other hand, when the cumulative-information icon 601 or 701 has been selected, operation S408 and its subsequent operations are performed.

In operation S408, the user I/O device 101 displays a list of event videos corresponding to the selected cumulative-information icon 601, as the thumbnail still images TH1 through TH6 (see FIG. 9). Accordingly, while a live-view video is being displayed on the first region (main region), videos of an event that has occurred in each panning angle-range or tilting angle-range may be searched for.

When it is determined in operation S409 that one video has been selected, namely, a thumbnail still image (for example, TH3) has been touched by the hand 501 of the user (see FIG. 10), the user I/O device 101 plays back the selected video, in operation S410. Referring to FIG. 11, a playback button 1101 is displayed on the selected second angle-range icon 302. When the user touches the playback button 1101, the selected video is played back on the main region of the display panel 101s.

In operation S411, the user I/O device 101 determines whether information of the event has been received. When the information of the event has been received, the user I/O device 101 performs an event processing mode, in operation S412. Operation S412 of performing the event processing mode will be described below in more detail with reference to FIGS. 12 and 13.

In operation S413, operations S401 through S412 are repeated until a termination signal is generated.

Figure 12:
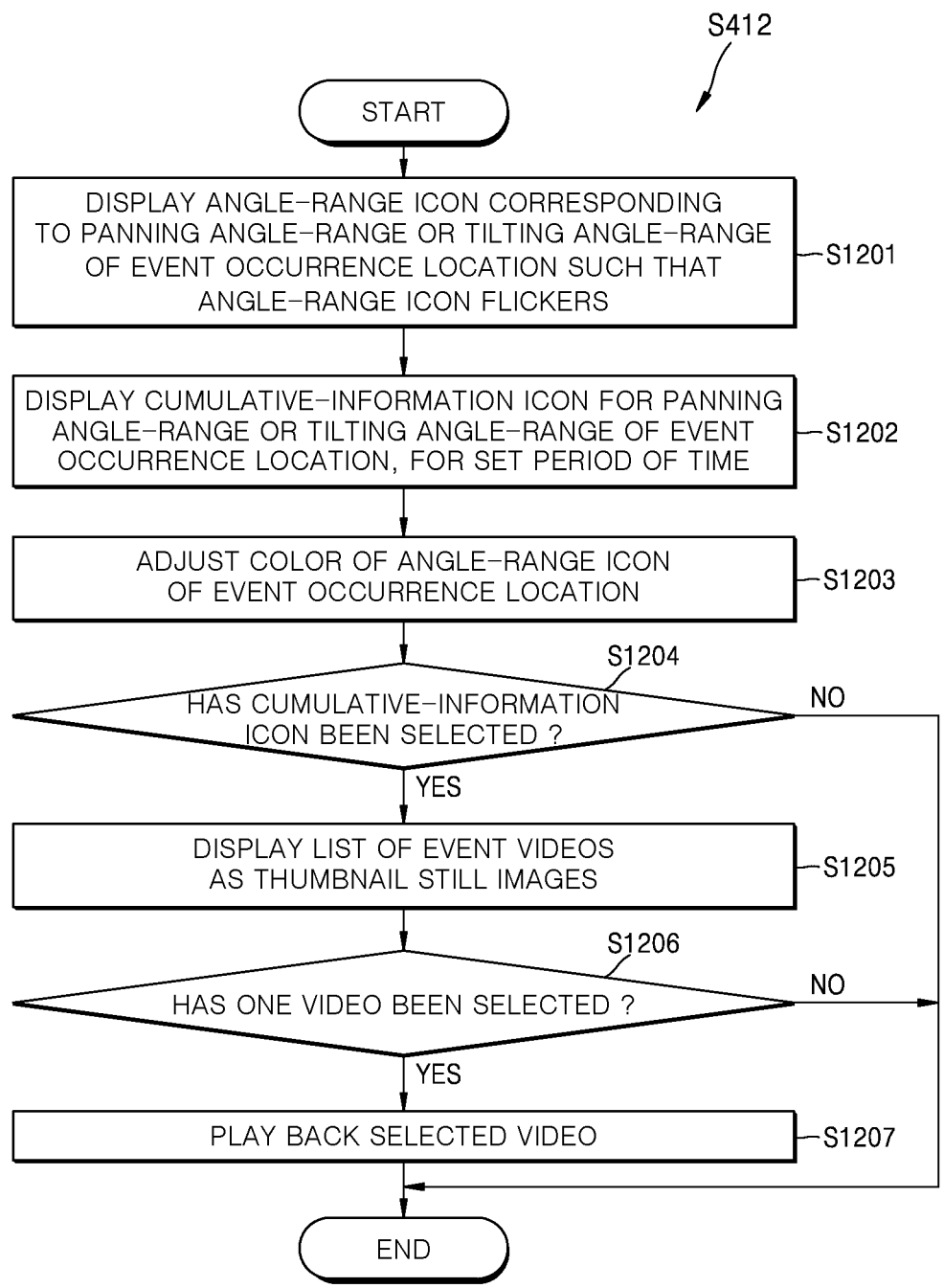
FIG. 12 is a flowchart of a detailed operation in an event processing mode (operation S412) of FIG. 4.

FIG. 12 is a flowchart of a detailed operation in the event processing mode (operation S412) of FIG. 4. The detailed operation in the event processing mode (operation S412) will now be described with reference to FIGS. 6 through 12.

In operation S1201, the user I/O device 101 of FIG. 1 displays an angle-range icon (for example, the second angle-range icon 302) corresponding to the panning angle-range or tilting angle-range of an event occurrence location such that the angle-range icon flickers.

In operation S1202, the user I/O device 101 displays a cumulative-information icon (for example, the cumulative-information icon 601) informing the cumulative information of the event, around the angle-range icon (for example, the second angle-range icon 302) corresponding to the panning angle-range or tilting angle-range of the event occurrence location, for a set period of time. In this way, the cumulative information of the event that has occurred in the panning angle-range (or tilting angle-range) of the angle-range icon (for example, the second angle-range icon 302) of the event occurrence location is provided to the user, and accordingly, convenient and effective monitoring may be performed.

In operation S1203, the user I/O device 101 adjusts the color of the angle-range icon (for example, the second angle-range icon 302) according to the number of times the event has occurred in the panning angle-range or tilting angle-range of the event occurrence location. Accordingly, the user is able to immediately predict the number of times an event has occurred in each panning angle-range or tilting angle-range, and thus convenient and effective monitoring may be performed. Color adjustments of the angle-range icons 301 through 309 will be described later in detail with reference to FIG. 13.

Next, in operation S1204, the user I/O device 101 determines whether the cumulative-information icon 601 or 701 has been selected. Referring to FIG. 8, the cumulative-information icon 601 is selected by being touched by the hand 501 of the user.

When the cumulative-information icon (for example, the cumulative-information icon 601) has been selected, the user I/O device 101 displays a list of event videos corresponding to the selected cumulative-information icon 601, as the thumbnail still images TH1 through TH6, in operation S1205 (see FIG. 9). Accordingly, while the live-view video is being displayed on the first region (main region), videos of the current event that has occurred in the panning angle-range (or tilting angle-range) of a location where the current event has occurred may be searched for.

When it is determined in operation S1206 that one video has been selected, namely, a thumbnail still image (for example, the thumbnail still image TH3) has been touched by the hand 501 of the user (see FIG. 10), the user I/O device 101 plays back the selected video, in operation S1207. Referring to FIG. 11, the playback button 1101 is displayed on the selected second angle-range icon 302. When the user touches the playback button 1101, the selected video is played back on the main region of the display panel 101s.

FIG. 13 illustrates a look-up table 1301 that is applied to color adjusting operation S1203 of FIG. 12. An algorithm of color adjusting operation S1203 will now be described with reference to FIGS. 3 and 13.

Grayscales of red (R) pixels of all of the angle-range icons 301 through 309 are constant all the time.

As for an angle-range icon for which the cumulative number of occurrences is less than or equal to 5, a grayscale of R pixels, a grayscale of green (G) pixels, and a grayscale of blue (B) pixels are the same as each other, namely, 200. However, as the cumulative number of occurrences increases, the grayscales of the G pixels and the B pixels gradually decrease. Accordingly, an R ratio of each of the angle-range icons 301 through 309 increases with an increase in the cumulative number of occurrences.

A method that is different from the look-up table 1301 of FIG. 13 may be applied. For example, the grayscales of the G pixels and the B pixels may each be constant, and the grayscale of the R pixels may gradually increase with an increase in the cumulative number of occurrences. Moreover, as the cumulative number of occurrences increases, the grayscale of the R pixels may gradually increase, and the grayscales of the G pixels and the B pixels may gradually decrease.

Because the colors of the angle-range icons 301 through 309 are adjusted according to the number of times an event has occurred as described above, the user may immediately predict the cumulative number of occurrences for each panning angle-range or each tilting angle-range. Accordingly, convenient and effective monitoring may be performed.

As described above, in the monitoring camera controlling method and the monitoring system according to the present embodiment, when one of a plurality of angle-range icons is selected, panning or tilting is performed at a representative angle of a panning angle-range or tilting angle-range of the selected angle-range icon. Accordingly, the following effects are generated.

First, a user may intuitively select an icon of his or her desired panning angle-range or tilting angle-range. Accordingly, a monitoring camera may fast perform panning or tilting at points of a panning angle or tilting angle desired by the user.

For example, after panning or tilting is fast performed at a representative angle of the panning angle-range or tilting angle-range selected by the user, the user may view a screen of a desired point via a small number of manipulations (such as, dragging).

Second, because the monitoring camera may fast perform panning or tilting at the points of the panning angle or tilting angle desired by the user, a presetting function with low precision does not need to be used. Accordingly, convenience of the user increases.

Third, because a plurality of angle-range icons corresponding to panning angle-ranges or tilting angle-ranges are displayed, cumulative information of an event that has occurred in the panning angle-range or tilting angle-range of each angle-range icon may be provided to the user. Accordingly, convenient and effective monitoring may be performed.

For example, when one angle-range icon is selected using a first method, panning or tilting may be performed as described above, and, when one angle-range icon is selected using a second method, a cumulative-information icon of an event may be displayed in correspondence with the selected angle-range icon.

Fourth, because the plurality of angle-range icons corresponding to the panning angle-ranges or tilting angle-ranges are displayed on the second region, while a live-view video is being displayed on the first region, videos of the event that has occurred in the panning angle-range or tilting angle-range of each angle-range icon may be searched for.

For example, when the user touches the cumulative-information icon, a list of the event videos may be displayed as thumbnail still images. Accordingly, when the user selects one thumbnail still image, a desired video may be played back.

Fifth, because the plurality of angle-range icons corresponding to the panning angle-ranges or tilting angle-ranges are displayed, a color of each of the plurality of angle-range icons may be changed according to the number of times an event has occurred in the panning angle-range or tilting angle-range of each of the plurality of angle-range icons. Accordingly, the user is able to immediately predict the number of times an event has occurred in each panning angle-range or tilting angle-range, and thus convenient and effective monitoring may be performed.

Sixth, because the plurality of angle-range icons corresponding to the panning angle-ranges or tilting angle-ranges are displayed, when an event occurs in one panning angle-range or tilting angle-range, an angle-range icon of a location where the event occurs may flicker. Accordingly, the user may intuitively ascertain the location where the event occurs, and thus convenient and effective monitoring may be performed.

While the present disclosure has been particularly shown and described with reference to preferred embodiments thereof, it will be understood by those skilled in the art that various changes in form and details may be made therein without departing from the spirit and scope of the present disclosure as defined by the appended claims.

Therefore, preferred embodiments should be considered in descriptive sense only and not for purposes of limitation. The scope of the present disclosure is defined not by the detailed description of the present disclosure but by the appended claims, and all differences within the scope will be construed as being included in the present disclosure.

INDUSTRIAL APPLICABILITY

The present invention is applicable to not only monitoring systems but also general photographing systems.

The invention claimed is:

1. A method of controlling a monitoring camera, performed by a user input/output (I/O) device that receives information of an event and a live-view video from the monitoring camera, the method comprising:
displaying the live-view video received from the monitoring camera on a first region of a display panel;
displaying, on a second region of the display panel, a plurality of angle-range icons corresponding to respective panning angle-ranges or respective tilting angle-ranges, the respective panning angle-ranges covering an entire angle range to which panning of the monitoring camera is executable and the respective tilting angle-ranges covering an entire angle range to which tilting of the monitoring camera is executable, each of the plurality of angle-range icons being assigned with an equal size of a panning angle-range or a tilting angle-range; and
in response to one of the plurality of angle-range icons being selected, transmitting, to the monitoring camera, a control signal for executing the panning or the tilting at a representative angle of a panning angle-range or a tilting angle-range assigned to the selected angle-range icon,
wherein the plurality of angle-range icons comprise a first plurality of angle-range icons that are arranged in a first direction in the second region of the display panel, and a panning angle-range or a tilting angle-range are assigned, without a user's manipulation, to each of the first plurality of angle-range icons to increase incrementally, by the equal size of the panning angle-range or the tilting angle-range between neighboring icons, in the first direction, the first plurality of angle-range icons being displayed simultaneously on the second region of the display panel.

2. The method of claim 1, wherein the representative angle is a center angle of the panning angle-range or the tilting angle-range.

3. A non-transitory computer-readable recording medium having recorded thereon a computer program for executing the method of claim 1.

4. The method of claim 1, wherein the plurality of angle-range icons comprise a second plurality of angle-range icons that are arranged in a second direction in the second region of the display panel, and a panning angle-range or a tilting angle-range assigned to each of the second plurality of angle-range icons decreases incrementally in the second direction.

5. The method of claim 1, wherein the panning angle-ranges or the tilting angle-ranges of the plurality of angle-range icons cover a range of 0° to (+180°) and a range of 0° to (−180°).

6. The method of claim 1, wherein the plurality of angle-range icons are assigned with the respective panning angle-ranges or the respective tilting angle-ranges without requiring a presetting function to set a panning angle or a tilting angle of the monitoring camera corresponding to each of the plurality of angle-range icons to be performed.

7. The method of claim 1, wherein the plurality of angle-range icons include an N number of angle-range icons (N being an integer equal to or greater than 2), and each of the N number of angle-range icons is assigned with a panning angle-range or a tilting angle-range of which a size is obtained by dividing the entire angle range to which the panning or the tilting of the monitoring camera is executable by N.

8. A monitoring system comprising:
a user I/O device in which a display panel is installed; and
a monitoring camera configured to perform photography while performing panning or tilting according to control signals from the user I/O device and to provide information of an event and a live-view video to the user I/O device,
wherein
the live-view video received from the monitoring camera is displayed on a first region of the display panel,
a plurality of angle-range icons assigned with respective panning angle-ranges or tilting angle-ranges are displayed on a second region of the display panel,
when one of the plurality of angle-range icons is selected, panning or tilting is performed at a representative angle of a panning angle-range or tilting angle-range assigned to the selected angle-range icon,
the representative angle is a center angle of the panning angle-range or tilting angle-range, and
when one of the plurality of angle-range icons is selected and a panning angle-range or tilting angle-range assigned to the selected angle-range icon includes a point that is not currently viewable on the display panel,
based on the one of the plurality of angle-range icons being selected according to a first method, the panning or the tilting is performed at a representative angle of the panning angle-range or tilting angle-range assigned to the selected angle-range icon, and
based on the one of the plurality of angle-range icons being selected according to a second method, cumulative information of an event that has occurred in the panning angle-range or tilting angle-range assigned to the selected angle-range icon is displayed.

9. The monitoring system of claim 8, wherein
in the first method, the one of the plurality of angle-range icons is touched, but is not dragged, and
in the second method, the one of the plurality of angle-range icons is dragged while being touched.

10. The monitoring system of claim 8, wherein, according to a number of times the event has occurred in the panning angle-range or the tilting angle-range assigned to each of the plurality of angle-range icons, a color of each of the plurality of angle-range icons is changed.

11. The monitoring system of claim 8, wherein the displaying the cumulative information of the event comprises displaying a cumulative-information icon providing the cumulative information of the event around the selected angle-range icon.

12. The monitoring system of claim 11, wherein the cumulative-information icon comprises:
a character indicating a type of the event; and
a number of times the event has occurred.

13. The monitoring system of claim 11, wherein
when the cumulative-information icon is selected, a list of event videos corresponding to the cumulative-information icon is displayed, and
when one video is selected from the list of event videos, the selected video is reproduced.

14. The monitoring system of claim 13, wherein the list of event videos comprises thumbnail still images respectively representing the event videos.

15. The monitoring system of claim 8, further comprising sensors configured to indicate that the event has occurred,
wherein, when the event occurs, event occurrence signals from the sensors are transmitted to the monitoring camera, and the monitoring camera transmits the information of the event based on the event occurrence signals to the user I/O device.

16. The monitoring system of claim 15, wherein
in the user I/O device, panning angle-ranges or tilting angle-ranges corresponding to respective locations of the sensors are set, and
upon receiving the information of the event, the user I/O device displays cumulative information of the event for a panning angle-range or a tilting angle-range of a location where the event has occurred, for a set period of time.

17. The monitoring system of claim 16, wherein displaying the cumulative information of the event comprises displaying a cumulative-information icon providing the cumulative information of the event is displayed around an angle-range icon of the panning angle-range or the tilting angle-range of the location where the event has occurred, for the set period of time.

18. A monitoring system comprising:
a plurality of sensors configured to detect that an event has occurred;
a monitoring camera; and
a user I/O device in which a display panel is installed, the user I/O device configured to:
display, on a first region of the display panel, a live view based on information received from the monitoring camera, and
display, on a second region of the display panel, a plurality of angle-range icons assigned with respective panning angle-ranges or tilting angle-ranges based on which panning or tilting of the monitoring camera is executable,
wherein,
in response to one of the plurality of angle-range icons being selected in the user I/O device, the monitoring camera is configured to execute the panning or the tilting at a representative angle of a panning angle-range or a tilting angle-range assigned to the selected angle-range icon,
in the user I/O device, panning angle-ranges or tilting angle-ranges corresponding to respective locations of the plurality of sensors are set among the panning angle-ranges or the tilting angle-ranges of the plurality of angle-range icons, and
a first angle-range icon is assigned with a panning angle-range or tilting angle-range including a point that is not currently viewable on the display panel, and upon receiving information of the event from at least one of the plurality of sensors, of which location is set to the panning angle-range or tilting angle-range of the first angle-range icon, the user I/O device selectively displays cumulative information of the event at or adjacent to the first angle-range icon.

* * * * *